(No Model.) 6 Sheets—Sheet 1.

J. F. PACKER & W. H. GAEDE.
APPARATUS FOR HEATING BUILDINGS.

No. 419,994. Patented Jan. 21, 1890.

Fig. 1.

Witnesses:
O. W. Bond
Albert H. Adams

Inventors:
John F. Packer
William H. Gaede

N. PETERS, Photo-Lithographer, Washington, D. C.

(No Model.) 6 Sheets—Sheet 2.

J. F. PACKER & W. H. GAEDE.
APPARATUS FOR HEATING BUILDINGS.

No. 419,994. Patented Jan. 21, 1890.

Witnesses:
O. W. Bond
Albert H. Adams

Inventor:
John F. Packer
William H. Gaede

UNITED STATES PATENT OFFICE.

JOHN F. PACKER AND WILLIAM H. GAEDE, OF CHICAGO, ILLINOIS, ASSIGNORS TO SAID PACKER AND J. HARLEY BRADLEY, OF SAME PLACE.

APPARATUS FOR HEATING BUILDINGS.

SPECIFICATION forming part of Letters Patent No. 419,994, dated January 21, 1890.

Application filed February 24, 1888. Serial No. 265,190. (No model.)

*To all whom it may concern:*

Be it known that we, JOHN F. PACKER and WILLIAM H. GAEDE, residing at Chicago, in the county of Cook and State of Illinois, and citizens of the United States, have invented a new and useful Improvement in Apparatus for Heating Buildings, of which the following is a specification, reference being had to the accompanying drawings, in which—

The various systems and forms of apparatus heretofore used for utilizing hot water in the heating of buildings of more than one story have been found defective in that the circulation would go to the highest coils or radiators first instead of to those coils or radiators nearest the boiler. In other words, it has been found impossible to control the circulation to any one floor from the boiler without shutting off the supply to all rooms heated above the one to be heated or overheating said upper rooms, and, furthermore, in all systems heretofore used it has been found utterly impossible to form a circulation below the boiler without the aid of what is known as an "expansion-chamber" in combination with a pressure, as the construction of the boiler has been such that the water would circulate within said boiler more readily than it would through the coils or radiators.

The practice has been to use a common boiler for the entire system of distribution, so that if the boiler fails to perform its work the entire heating system was thrown out and the cutting out of one radiator to the relief of the other was an impossibility, the result being that if a flow was to one floor and radiator the other floors and radiators would not receive the full supply of the hot water.

The objects of this invention are to overcome the objections and difficulties belonging to the old system and forms of apparatus for heating with hot water, and to improve the arrangement, construction, and operation of the boilers, distributing-head, and pipes, and receiving-head and device, by which a perfect and uniform circulation can be had for the radiators on all the floors of a building. The supply for one floor and radiator can be shut off without interfering with the supply and radiators for the other floors, and the boiler is so constructed that repairs can be made thereon without interfering with the heating of the building, the boiler and the arrangement of the circulating devices being one that will avoid the objectionable feature of the circulation in the boiler, and its construction enabling the full battery of boilers to be used for any one floor or each section of a boiler to be used for any one floor.

Its nature consists in the several parts and combinations of parts hereinafter described and claimed as new.

In the drawings, A represents the walls of a furnace.

B is the ash-pit.

C is the grate above which is a fire-box having at its rear end a fire-wall c, and access is had to the fire-pot above the grate by a door a and to the ash-pit by a door b.

D is a combustion-chamber between the first and second tiers of boilers.

E is a combustion-chamber above the second tier of boilers.

F is the smoke-flue leading from the chamber E, and, as shown, a pipe B'', having a damper $b'$, is provided, running from the ash-pit to the smoke-flue, for a direct draft from the ash-pit to the smoke-flue instead of through the fire-pot, thereby checking the combustion.

G is the top, formed of a series of plates $g$ in the construction shown, a plate being provided for each series of supply-tubes, and each plate has a boss for forming a tight joint around the supply-tube.

H are the upper and lower boilers of the first section of a battery of boilers, connected one with the other by a series of tubes H', and leading from the respective boilers H of the upper series is a discharge-tube $H^2$.

I are the upper and lower boilers of the second section of a battery of boilers, connected by a series of pipes I', and from each of the upper boilers I leads a discharge-tube $I^2$.

J are the upper and lower boilers of the third section of a battery of boilers, connected by pipes J', and leading from the upper boilers J are supply-tubes $J^2$, leading to the distributing-head and forming discharge-tubes for each boiler, and the discharge-tubes $H^2$ and $I^2$ form supply-tubes leading from the respective boilers to the distributing-head.

Each of the tubes H', I', and J' is of less capacity to hold or pass water than the boilers, while their combined heating capacity is greatly augmented. The usual exterior diameter of a boiler is five and one-half inches and the interior diameter of the tubes is two inches. The entire heating-surface of the boiler is therefore about equal to a flat plate of the same length seventeen inches wide, while the combined heating capacity of the tubes is about equal to that of a plate equal to the length of a tube and forty-eight inches wide.

Figure 2:
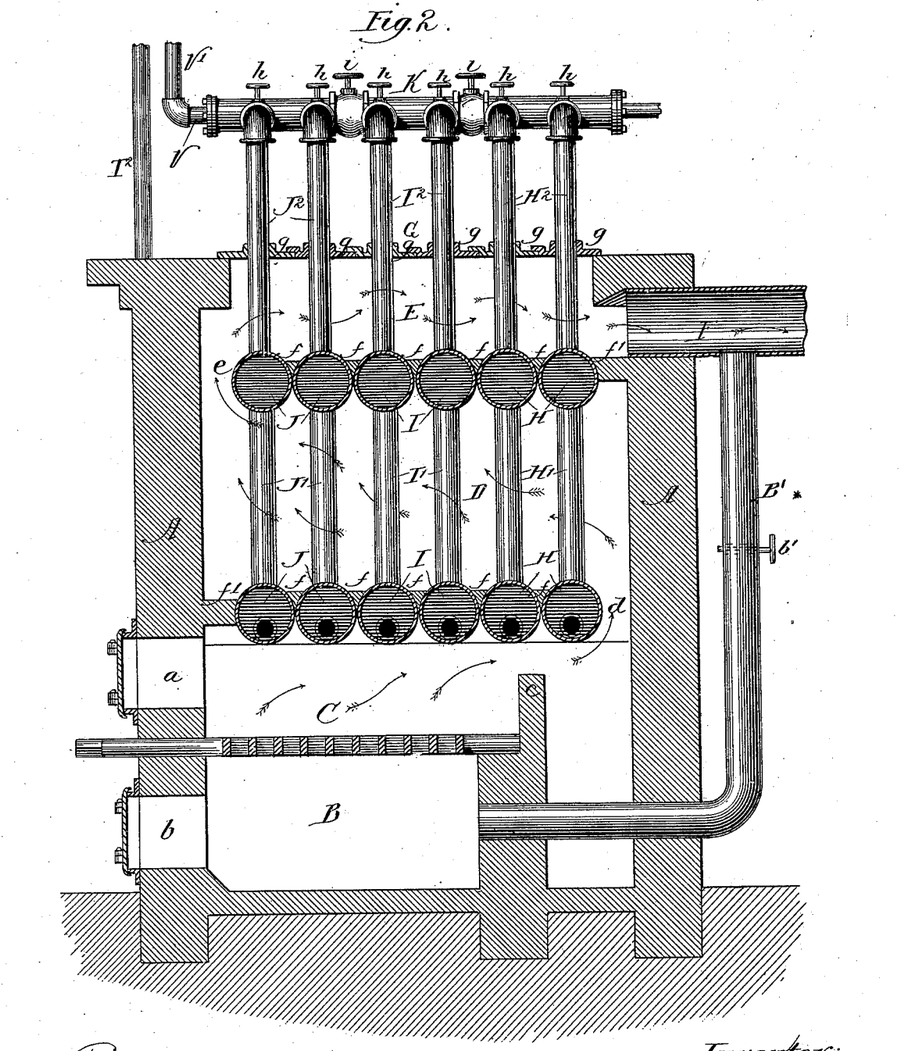
Fig. 2 is a longitudinal section through the furnace and boilers.

The interior capacity of a boiler as a tube or in area of cross-section is about nineteen and six-tenths inches, while the combined area of the tubes is eighteen and eight-tenths. It will, however, be understood that these relative proportions are those deemed best, and that they may be varied to some extent. The most intense heat from the furnace comes in direct contact with the lower boilers, and its intensity is somewhat diminished in the chamber D, which surrounds these connecting-tubes, and by thus dividing the water and increasing the heating-surface the result from the tube heating in the chamber D is substantially equal to that of the direct heat from the furnace, while additional heat is imparted to the upper boilers at the same time, so that a rapid and nearly-equalized heating is obtained and a hotter body of water is maintained in the upper boiler than in the lower, which forces a circulation through the boilers and tends to increase the rapidity of the entire circulation of water and prevents a back circulation within the boilers or heater. The lower series of boilers H, I, and J do not extend the full length of the furnace-chamber, and at one end the space between the boiler and the wall of the furnace is closed by a wall or partition $f'$, and the space between the respective boilers is closed by a filling $f$, so that the boilers form a partition by which the heat and products of combustion are carried beneath the boiler to pass into the combustion-chamber D through the passage $d$, between the wall of the furnace and the boiler, as shown in Fig. 2, and the upper series of boilers also forms a partition or deflector in connection with a wall $f'$ and fillings $f$ between the combustion-chamber D and the combustion-chamber E, by which the heat and products of combustion will pass beneath the upper series of the boilers H, I, and J, to enter the combustion-chamber E through the passage $e$, between the furnace-wall and boiler, to pass out through the smoke-flue F. This arrangement, it will be seen, causes the products of combustion and the heat to pass across beneath the lower series of boilers and beneath the upper series of boilers into the chamber E and across such chamber above the upper series of boilers, thus giving both series of boilers the full benefit of the heat above and below them, and at the same time the heat in its passage through the chamber D will act on the series of connecting-tubes H', I', and J', giving the water the benefit of this heating in the tubes H' I' J', and inasmuch as the diameters of these tubes are proportionately less the water will receive the full benefit of the heat passing through the chamber D.

Figure 1:
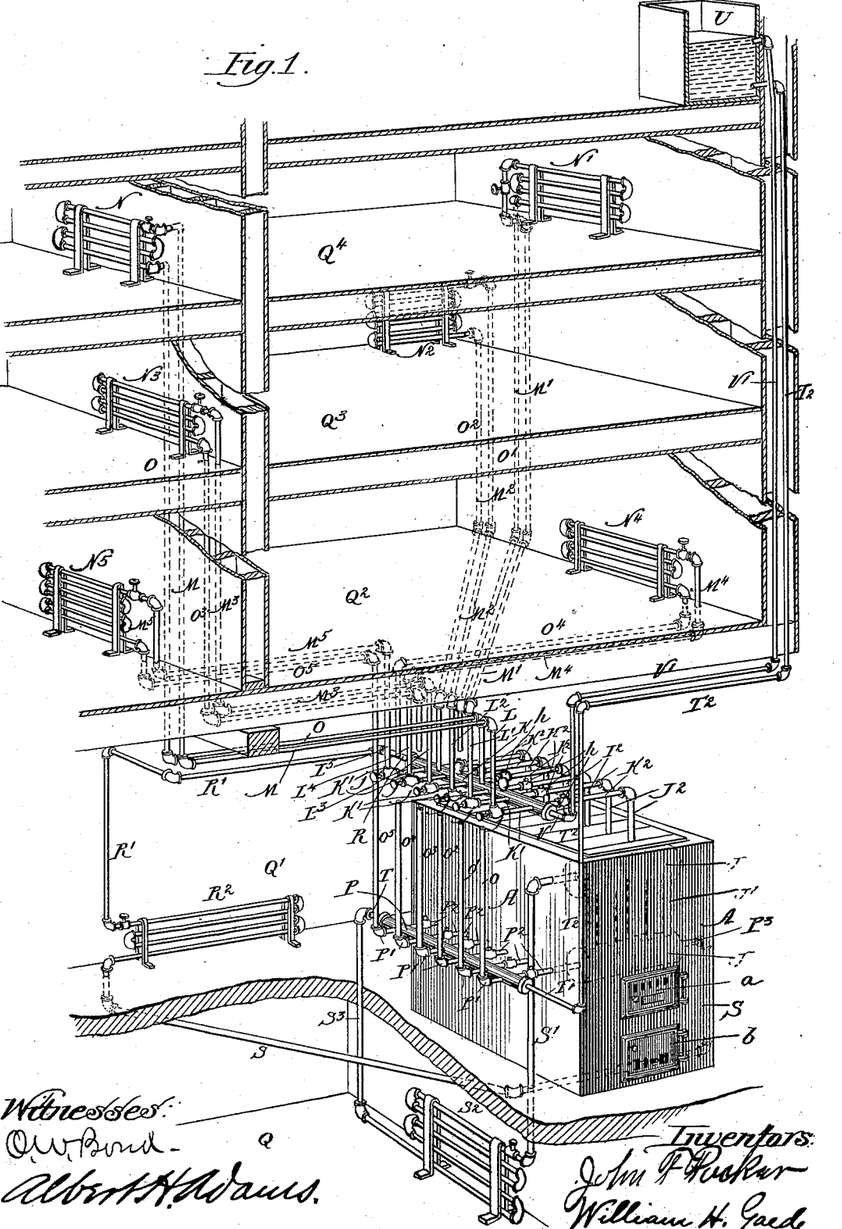
Figure 1 is a perspective view, partly in section, showing the application of the invention to heating a building having five floors.
Figure 3:
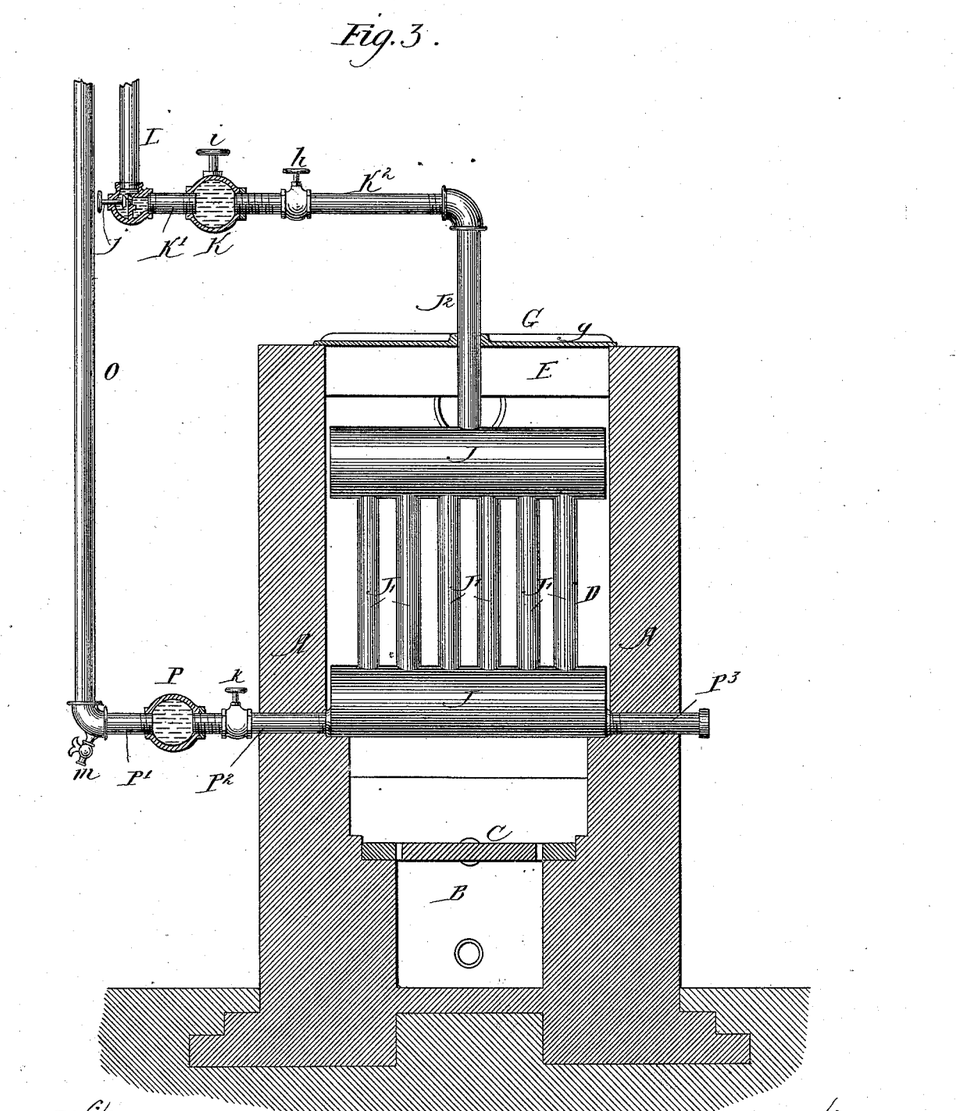
Fig. 3 is a cross-section through the furnace and boilers.

K is a distributing-head for the hot water, of a length and divided into sections to correspond to the sections of the battery of boilers, each division of the head, as shown, being designed to coact with the supply-pipes from each section of the boiler. This distributing-head K, as shown in Figs. 1, 2, and 3, on one side is provided with a series of pipes or tubes K', and on the opposite side with a series of pipes $K^2$, which pipes $K^2$ are connected with the pipes $H^2$ $I^2$ $J^2$, one for each, by a curved coupling or elbow, and each pipe $K^2$ is provided with a shut-off valve $h$, by means of which any one pipe can be cut off from the distributing-head or be made to have communication with such head, and thus be cut off or be put into communication with the boiler with which the pipe $K^2$ has communication, and each pipe or tube K' is provided in its end with a suitable shut-off valve $j$, by means of which each pipe K' can be placed in communication with the distributing-head or have its supply shut off. The pipes K' $K^2$ in this case are arranged in couplets, two for each section of the distributing-head; but they can be arranged with one or more boilers for each section, and the distributing-head sections are separated one from the other by a suitable shut-off valve $i$, which valve can be closed to close the communication with all of the sections or with two of them, or with any number, if more than three sections are used, and, as shown, each section of the distributing-head receives the water hot from a section of the battery of boilers—that is, one section of the distributing-head will receive the water from the boilers H through the pipes H' and H², another section will receive the water from the boilers I through the pipes I' I², and another section will receive the water from the boilers J through the pipes J' J², and if the battery of boilers has additional sections the distributing-head will have a corresponding number of divisions or chambers with shut-off valves $i$ for each, and if the battery of boilers has a less number of sections the distributing-head will have a corresponding number of chambers or divisions. The supply from any one section of the boilers can be cut off from the distributing-head by closing the valve or valves of the pipe or pipes K² which have communication with the boiler or boilers of the section, and when so shut off the supply for the shut-off section of the distributing-head can be had by opening the valve $i$ between it and the adjoining section.

Figure 4:
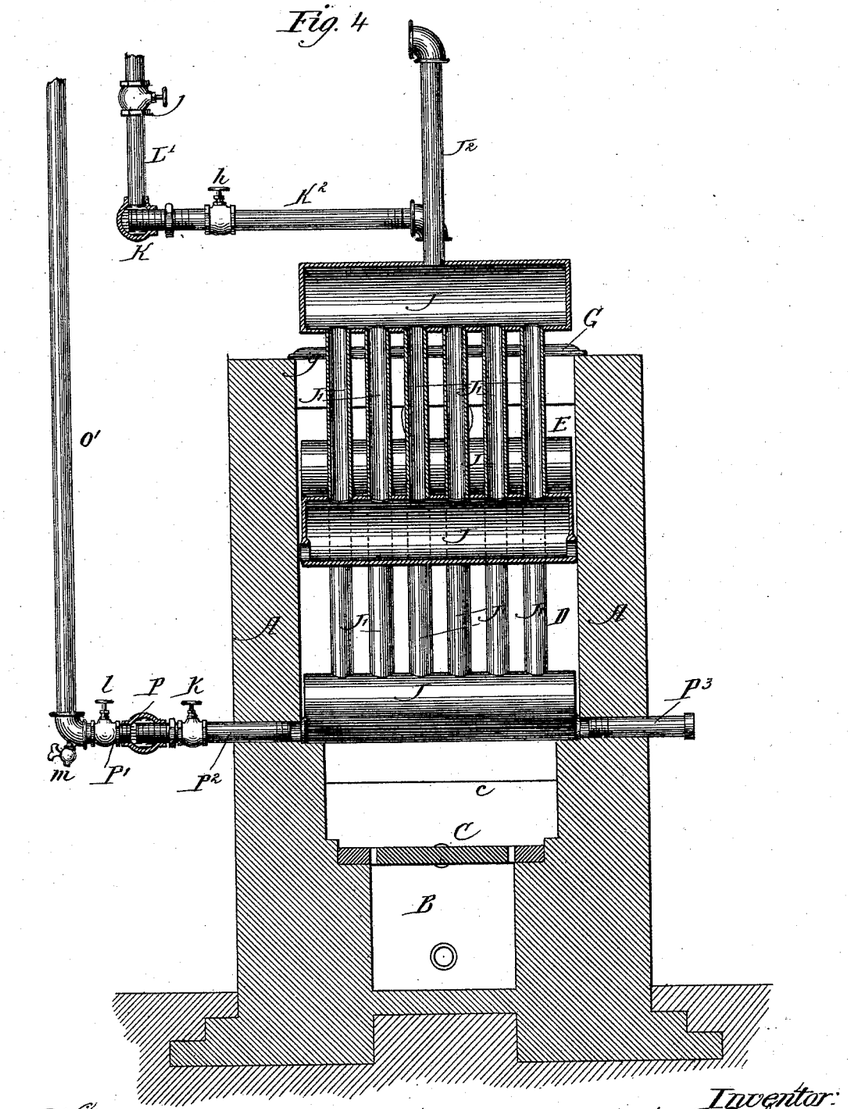
Fig. 4 is a cross-section showing a modification in the construction and arrangement of the hot-water-distributing head, distributing-pipes, and the controlling-valve, and showing also a modification in the boiler-supply head and its pipes and valves.
Figure 5:
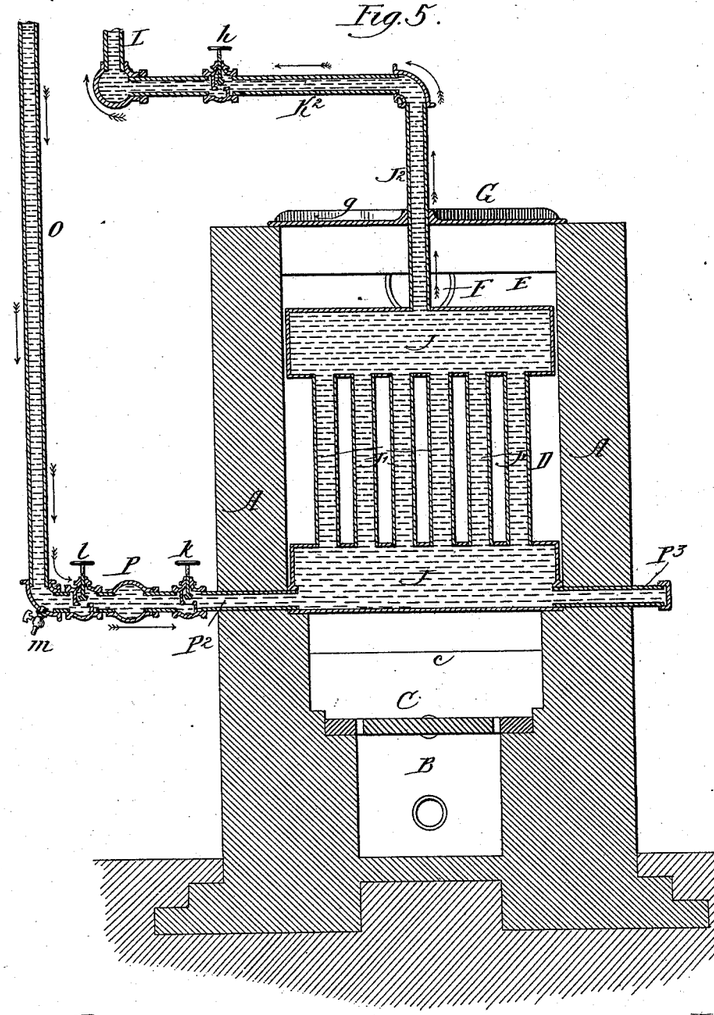
Fig. 5 is a cross-section similar to Fig. 4, showing the boilers and distributing-head and receiving-head with their pipes, with the water in the several pipes.
Figure 6:
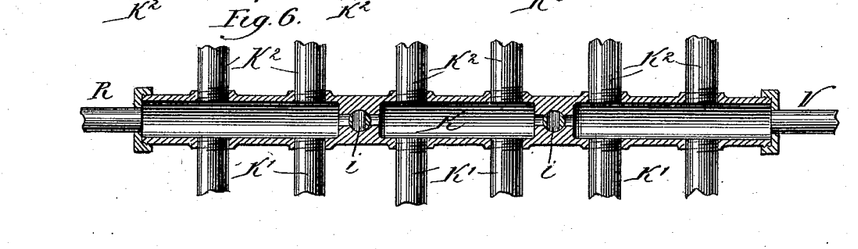
Fig. 6 is a detail in section showing the distributing-head, pipes, and valves of Fig. 3.

L L' L² L³ L⁴ L⁵ are supply-pipes for the radiators, leading from the pipes K' of the distributing-head K, as shown in Figs. 1 and 3, or having a direct communication with the distributing-head, as shown in Figs. 4 and 5, and when arranged as shown in Fig. 3 the shut-off valve $j$ for each pipe is arranged in the side of the distributing-head to either close or open the end of the supply-tube K², as shown in Fig. 3; or, if desired, the shut-off valve for the supply-pipe leading from the distributing-head can be located in each supply-pipe, as shown in Fig. 4.

M M' M² M³ M⁴ M⁵ are the supply-pipes connecting with the respective supply-pipes L L' L² L³ L⁴ L⁵.

N N' N² N³ N⁴ N⁵ are radiators to which the respective supply-pipes M M' M² M³ M⁴ M⁵ lead, which radiators are located on the different floors of the building, as shown in Fig. 1.

O O' O² O³ O⁴ O⁵ are the return-pipes from the respective radiators N N' N² N³ N⁴ N⁵.

P is the receiving-head for the return-pipes, forming also the water-supply head for the battery of boilers. This supply-head P on one side has a series of tubes P', corresponding in number with the number of return-pipes, so that each pipe will through its pipe or tube P' have communication with the receiving supply-head P, and this head P on the opposite side is provided with a series of pipes or tubes P², corresponding in number to the number of boilers in the lower series of the battery, so that each boiler of the lower series will receive a water-supply from the head P through its pipe or tube P², and each pipe P², as shown in Figs. 1 and 3, is provided with a shut-off valve $k$, by means of which communication between any one boiler and the supply-head P can be shut off or opened. As shown in Figs. 4 and 5, a valve $l$ is located between the receiving supply-head P and each return-pipe, by means of which the communication between the head P and each return-pipe can be shut off or opened, and each return-pipe at its lower end or juncture with the head P is provided with a drip-cock $m$, by means of which the drip or water in the return-pipe can be drawn off. Each lower boiler, at the end opposite to the supply pipe or tube P², as shown in Fig. 5, has a pipe or tube P³, closed by a suitable cap or cover, by removing which and closing the valve in the pipe P² and the valve $h$ in pipe K² the water can be removed from the upper and lower boilers in case of leakage or other accident.

Q Q' Q² Q³ Q⁴ Q⁵ are the floors of the building to be heated, Q being the basement.

R is a pipe or tube leading from the end of the supply-head K and connected with a pipe R', which leads to a radiator R² on the first floor.

S is a return-pipe leading from the radiator or coil R² beneath the floor and furnace, and connected, as shown, with the pipe or tube P³ of one of the lower boilers J, and from the companion upper boiler J a pipe S' leads to the radiator or coil S² in the basement, from which radiator or coil S² a return-pipe S³ leads into the end of the supply-receiving head P. In making a circulation, as shown in Fig. 1, with the elements J, S', S², S³, T, and P, the valve $h$ in pipe K² is closed, thereby allowing no mode of escape for the water as it is heated and rises in the boiler except through the pipe S', and as the boiler is so constructed as not to admit of a circulation within itself, it will readily be seen than we are able to force the circulation to any required distance below the boiler or furnace. The advantages of this construction are that the boiler or heater is not required to be at a lower point than the lowest radiator, and that the ascensive force of the heated water is utilized as a puller, and the increased gravity of the cooler water as a pusher. The peculiar circulation is produced by so combining both of these forces in our apparatus that the radiators below the heater may be operated as efficiently as those above. The circulation is compelled in a continuous direction by the restricted passages between the upper and lower boilers of the sections used. The force which pushes or pulls the circulation is developed in a single pair or section of the heater. The supply-pipe to the lower radiator is the only means of escape from the upper boiler in one arrangement, and the return-pipe from the lower radiator is the only source of supply to the lower boiler in the other arrangement.

T is a pipe or tube in the end of the supply-head P, to which is connected the return-pipe S³, and from the other end of the head P leads a pipe or tube T', which is connected with a pipe T² leading to an expansion or overflow reservoir or chamber.

U is the expansion reservoir or chamber, located, as shown, above the upper floor of the building.

V is a pipe or tube leading from the end of the head K and connected with a pipe V', which leads to the expansion reservoir or chamber U.

The circulation is as follows: The heat and products of combustion passing beneath the lower series of boilers will heat the water therein, and the water rising in the connecting-tubes between the upper and lower boilers will be still further heated by the heat and products of combustion passing through the chambers D, and by the action of the heat and products of combustion passing through the chambers D and E the water in the upper series of boilers will be heated to the degree required, and will pass from the upper series of boilers through the respective supply-pipes $K^2$ to enter the distributing-head K. The water from the upper and lower boilers J of the first section of the battery of boilers will pass through the supply-pipes $J^2$ and $K^2$ into the section of the distributing-head K into which the tubes $K^2$ lead, and will pass from such section into the tubes K', and from one of these tubes the supply will pass to the pipe or tube L, thence to the pipe or tube M, to the radiator or coil N in the top story, and, after passing through the coil, the supply will be returned through the tube or pipe P' to the receiving supply-head P to pass to the lower boiler J through the pipe or tube $P^2$. The supply from the other tubes $K^2$ of the section of the distributing-head supplied from the boilers J will pass into the pipe or tube $L^2$, thence to the pipe or tube M', to the radiator-coil N', and this supply will be returned by the pipe or tube O' to the receiving supply-head P to pass to the boilers. The supply from the next section of the battery of boilers will pass to its section of the distributing-head K through the supply-pipes $I^2$ $K^2$, and from the connecting pipe or tube K' one supply will pass through the pipe or tube $L^2$ and pipe or tube $M^2$ to the radiator or coil $N^2$, and this supply will return through the pipe or tube $O^2$ to the receiving supply-head P to be returned to the boiler, and the supply from this same section of the distributing-head will pass through the pipe or tube $L^3$ and pipe or tube $M^3$ to the radiator or coil $N^3$, and this supply will be returned by the pipe or tube $O^5$ to the receiving supply-head P to be returned to the boilers. The supply from the section of the battery of boilers H will pass to its section of the distributing-head K through the supply-pipes $H^2$ and $K^2$, and from this section through the tubes K' one supply will pass through the pipe or tube $L^4$ and pipe or tube $M^4$ to the radiator $N^4$, and this supply will be returned by the pipe or tube $O^4$ to the receiving supply-head P to pass to the boilers, and a supply from this same section of the distributing-head will pass through the pipe or tube $L^5$ and pipe or tube $M^5$ to the radiator $N^5$, and this supply will be returned through the pipe or tube $O^5$ to the receiving supply-head P to pass to the boilers.

The supply for the respective radiators on each floor so far described is taken from the respective sections of the distributing-head K; but by opening the valve $i$ between two sections these sections will be common to the several leading-pipes for the radiators or coils supplied from the two sections, and by opening all the valves $i$ the distributing-head K becomes common to all the leading-pipes for the radiators or coils. The return for all of the radiators or coils passes to a common receiving supply-head P, from which the lower tier or series of boilers of the battery is supplied with water through the respective connecting pipes or tubes $P^2$. The leading-pipes for the several coils can be entered directly into the distributing-head K, dispensing with the connecting pipes or tubes K', and whenever it is desired to shut off the supply from any one boiler or section of boilers the valves or valve of the pipes or pipe $K^2$ which has communication with the boilers or boiler is shut down, stopping the supply from the boilers or boiler, and in such case the supply for the leading pipes or pipe of the section of the distributing-head supplied by the cut-out boiler pipe or tube will be had from the one tube of the boiler-supply which is not shut down, or by opening the valve $i$ of the adjoining section of the head when both of the boiler-supply tubes are shut down.

The circulation for the radiator or coil $R^2$ is had from the distributing-head through the pipe or tube R and the pipes or tubes R', and the return from the radiator or coil $R^2$ is had through the pipe S to the pipe or tube $P^3$ of the lower boiler with which the connection is made, and when the return is had in this manner the valve $k$ of the pipe or tube $P^2$, which should supply the lower boiler with which the pipe S is connected, is shut down, so that no supply from the receiving supply-head P is had to such boiler, and in making a circulation through the coil $R^2$ it could be had by returning to any one of the battery of boilers as well as to the one shown in Fig. 1, provided the valve K of that particular boiler were closed, so as to stop communication between said boiler and the supply-head.

The upper boiler of the pair to the lower one of which the pipe S is connected has connected therewith a pipe or tube S', which leads to the radiator or coil $S^2$ in the basement supplying hot water to such radiator or coil, and the return from such coil is delivered into the end of the receiving-head P by the pipe or tube $S^3$ and the pipe or tube T, and when the return-pipe S and the supply-pipe S' are used the boiler-supply pipes of the boilers connected with the pipe S and S' are shut off from the distributing-head K by closing the valve $h$ of the pipe or tube $K^2$, which communicates with the boiler having the supply S' connected therewith, causing the hot-water supply from such boiler to pass from the boiler through the pipe S' to the basement radiator or coil, and in such case the section of the distributing-head K receives its supply by the boiler-supply tube not shut off. It will thus be seen that the sections of the distributing-head can be closed one from the other to receive a water-supply from a boiler or boilers of the section of a battery of boilers, and that such supply can be carried to the radiator or coil connected by pipes or tubes with the distributing-section, or that the supply for any one section of one or both pipes can be closed down, or that the supply to any radiator or coil can be shut off by closing the valve $j$ of the pipe or tube leading to such radiator or coil, or that one section of the distributing-head can be cut off from a boiler-supply and a supply from the other boilers can be had therefor by opening the valve $i$ of the adjoining section, and it will also be seen that a circulation for a radiator or coil located below the boilers can be had without disturbing the circulation for the other radiators or coils of the building, and it will also be seen that the circulation of any one of the boilers is wholly independent of the circulation of the remaining boilers, and that by the connecting pipe or tube between the upper and lower boilers no circulation of the water in the boilers without rising to the distributing-head can be had, and by these several features a system of hot-water heating for buildings is produced which is efficient and perfectly reliable and by which the circulation is perfectly free and independent to any radiator or coil, and a supply for a lower radiator or coil is had.

Each division or section of the battery of boilers is independent of the others, and each pair of boilers of each section is also independent one from the other, and by this arrangement a section or pair of boilers can be removed for the purpose of repairs or be replaced by other boilers when worn out without interfering with the operation of the heating apparatus as a whole. The pair of boilers is removed by closing the valve $h$ of the supply-tube $K^2$ of the boiler to be removed and closing the valve $k$ of the supply-pipe $P^2$ of the head P. The supply-pipe $K^2$ is then unscrewed from its coupling with the pipe connected with the upper boiler to be removed, and the pipe $P^2$ is unscrewed from the lower boiler to be removed, and when a pipe $P^3$ is used on such boiler it is also unscrewed, and when these pipes are unscrewed from the upper and lower boilers the pair of boilers is disconnected and can be lifted from position, as shown in Fig. 4, and removed for repairs or to be replaced by a new pair of boilers, and the repaired boilers or the new ones can be dropped back into position and the pipes $P^2$ and $P^3$ again connected for use. The several pipes are to have suitable packing or stuffing boxes or collars at the joints to prevent leakage, and, as shown, the pipe $K^2$ is unscrewed from its boiler-connecting pipe by turning back the collar adjacent to the supply-head K sufficiently far to allow the end of the pipes $K^2$ connected with the supply-head to be turned into the supply-head the distance required to disconnect the pipe from the boiler-supply pipe, and, as shown, the supply $P^2$ is disconnected from its boiler in a like manner by turning its end into the supply-head P, as shown in Fig. 4.

The shut-off valves $k$ will perform the required office of closing the supply to any one lower boiler; but in case it is required to have the return enter the supply-head from any one radiator or coil each return-pipe can be provided with a shut-off valve $i$, and in case the supply from the distributing-head to any one coil is to be shut off without shutting off the boiler-supply it can be done by closing down the valve J of the pipe or tube leading to the radiator or coil.

The supply to the distributing-head K can be taken therefrom and delivered to a receiver or chamber U by the pipe or tube V and the pipe or tube V', and from such chamber the water can return to the receiving supply-head P by the pipe or tube $T^2$ and the pipe or tube T'.

It is utterly impossible to create a circulation from the boilers through the supply-head P, and this is one of the advantages gained by our construction of boilers for water-circulation.

Figures 7, 8:
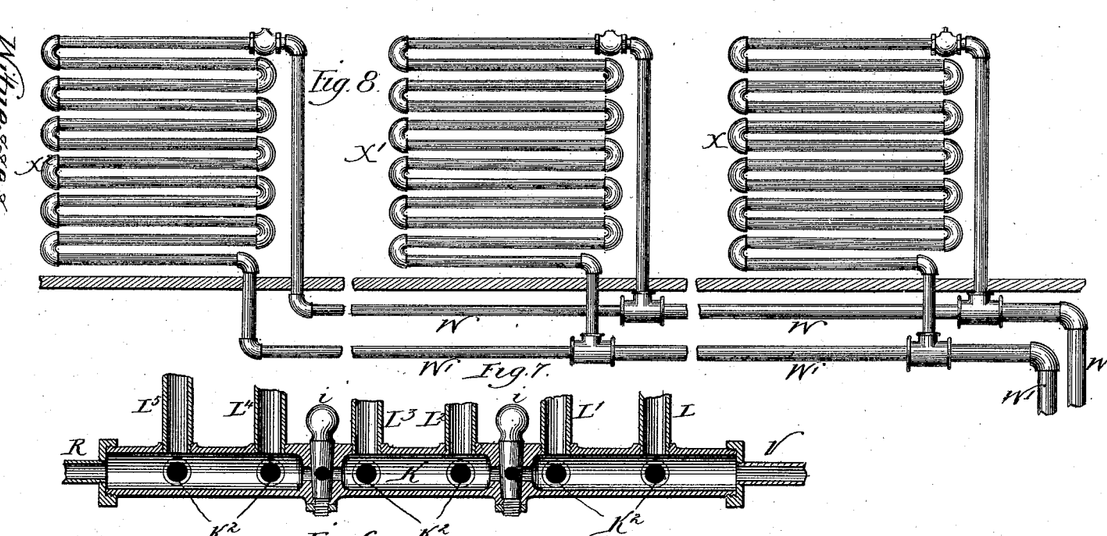
Fig. 7 is a detail in section showing the distributing-head, pipes, and valves of Fig. 4.
Fig. 8 is an elevation showing an arrangement of heating-coils and supply-pipes by which a graduated supply is had for the various radiators.

The arrangement shown in Fig. 1 is for supplying the water to radiators or coils on the several floors in which radiators or coils for any one floor are located at a distance apart not in the same line one with the other; but where the radiators are located on a floor in a line a common supply-pipe and a common return-pipe can be used for all of the radiators, as shown in Fig. 8, in which W is a supply pipe or tube, and W' the return pipe or tube, and X, X', and $X^2$ are the radiators. The supply-pipe W leading to the first coil X is connected with the coil by a pipe or tube of a less diameter than the main supply, and from the coupling to the first coil the supply-pipe W leading to the second coil is of a less diameter than the main supply, and the pipe leading to the second coil is of less diameter than the section of the main supply-pipe leading to its coupling, and from the coupling to the coil X' the main supply-pipe W is again reduced in diameter for supplying the coil $X^2$, and the return-pipes for these coils X X' are divided into sections of different diameters, the smallest being the return from the coil X. This reduction in the supply and return grades the supply of water proportionately for each radiator, and thus enables a common supply and return to be used for several radiators or coils.

It is evident that the entire battery of boilers can be used to generate steam to pass to the radiators or coils for heating purposes, or a portion of the battery of boilers can be used to generate steam to pass to the radiators or coils for heating purposes and the remaining boilers be used for producing hot water and circulating the same through the radiators or coils, and when used as a combined steam and hot water apparatus some of the floors will be heated by steam and the other floors by hot water.

The generating of steam by all or a portion of the boilers can be had without any change in the arrangement of the apparatus as a whole, except that of subjecting the boilers to a heat sufficient to generate steam to pass to the distributing-head and thence to the radiators or coils, from which the water of condensation will be returned to the boiler-supply head to be returned to the boilers.

The steam will pass from the boilers through the pipes leading to the distributing-head and from the section of the head into which the steam enters, and thence through the pipes leading to the radiators or coils, in the same manner as with hot water alone, and the water of condensation will be returned to the boiler's supply-head by the pipes leading from the radiators or coils to the head in the same manner as for hot water alone.

The same furnace and boilers can be used for supplying either hot water alone or steam alone, or both together, producing a perfect system of hot-water and steam heating.

What we claim as new, and desire to secure by Letters Patent, is—

1. The combination, with a battery of boilers, each set composed of an upper and a lower boiler connected by tubes, of a common distributing-head K, connected with the upper ones of the series of boilers, said distributing-head being provided with valves so arranged as to be capable of dividing said distributing-head into a number of independently-operating subdivisions equal to the number of sets of boilers, substantially as described.

2. A battery of boilers divided into sections and the sections divided into pairs, working independently, by means of the valve $h$, in combination with a distributing-head divided into sections by a valve $i$, and a supply-pipe leading from each pair of boilers to the distributing-head and provided with a shut-off valve for enabling the supply to be shut off from any pair of boilers without affecting the circulation, substantially as specified.

3. A battery of boilers divided into sections and the sections divided into pairs, in combination with a distributing-head, supply-pipes from each pair of boilers to the distributing-head, each pipe being provided with a shut-off valve and the distributing-head being divided into sections by valves, and a series of pipes, each pipe having a shut-off valve and leading from the distributing-head to the radiators or coils on the several floors of a building for forcing a circulation through the respective coils or stopping the circulation in any coil, substantially as specified.

4. The combination, with a distributing-head divided into sections by valves, of a series of pipes leading from the boilers to the distributing-head and controlled by valves, and a series of pipes leading from the distributing-head to the radiators or coils and controlled by valves, substantially as and for the purpose specified.

5. A battery of boilers divided into sections, with the sections divided into pairs, a distributing-head divided into sections by valves, a series of supply-pipes, each pipe controlled by a valve and leading from the boilers to the distributing-head, and a series of pipes controlled by valves and leading from the distributing-head to the radiators or coils of a building, in combination with a return-pipe, a common receiving supply-head for the return-pipes, and connecting pipes or tubes, each controlled by a valve and leading to the boilers, for supplying the boilers with water from the return, substantially as specified.

6. A battery of boilers formed of independent working-boilers arranged in pairs, a distributing-head divided into sections by valves, a series of supply-tubes, one leading from each pair of boilers and controlled by a valve, a series of pipes leading from the distributing-head, one for each coil, and controlled by a valve, in combination with a series of return-pipes, one from each radiator or coil and having a valve, a receiving supply-head common to all the return-pipes, and a series of pipes leading from the receiving supply-head, one to each pair of boilers and controlled by a valve, substantially as specified.

7. A distributing-head for a radiator-supply, a connecting-pipe leading from such head to a radiator, and a return-pipe from such radiator or coil leading to a boiler, in combination with a companion boiler, a pipe leading from such boiler to a coil or radiator lower than the boiler, a pipe leading from the radiator or coil, and a receiving supply-head to which the return-pipe is connected for furnishing a supply and return from a lower coil, substantially as specified.

8. A series of boilers arranged in pairs, a distributing-head receiving a supply from each pair of boilers by a connecting pipe or tube, a series of pipes leading from the distributing-head to the radiators or coils, a series of pipes from such radiators or coils, and a receiving supply-head common to the return-pipes and connected with the boilers, in combination with a return-pipe from one of the radiators or coils leading directly to one of a pair of boilers, a supply-pipe leading from the other boiler of the pair to a radiator or coil located below the series of boilers, and a return-pipe from such lower radiator or coil to the receiving supply-head for circulating the water through the radiators or coils on all the floors of the building, substantially as specified.

9. The combination, with a furnace, a battery of boilers, a distributing-head divided by means of valves into a number of independent subdivisions, and a receiving supply-head, of the valves $h\ k$ and the pipes $K^2\ P^2$, detachably connected to the boilers, whereby one or more sections of a battery can be thrown out of use or be detached without interfering with the circulation to and from the remaining sections, substantially as described.

10. The combination, with a battery of boilers composed of a number of independently-operating sections connected with radiators located on different floors of the building to be heated, of a distributing-head divided into a number of sections equal to the number of floors, pipes for separately connecting the boiler-sections to the sections of the distributing-head, and pipes for separately connecting the sections of the distributing-head to the radiators, whereby the radiators on different floors are supplied with hot water independent of each other for the purpose of effecting a positive circulation in all the radiators at the same time, substantially as described.

JOHN F. PACKER.
WILLIAM H. GAEDE.

Witnesses:
O. W. BOND,
ALBERT H. ADAMS.